United States Patent
Milthers et al.

(10) Patent No.: US 9,360,018 B2
(45) Date of Patent: Jun. 7, 2016

(54) PUMP SYSTEM

(75) Inventors: Jens Kjaer Milthers, Støvring (DK); Kim Hulegaard Jensen, Rødkærsbro (DK); Lars Sund Mortensen, Aars (DK)

(73) Assignee: Grundfos Management a/s, Bjerringbro (DK)

( * ) Notice: Subject to any disclaimer, the term of this patent is extended or adjusted under 35 U.S.C. 154(b) by 671 days.

(21) Appl. No.: 13/193,851

(22) Filed: Jul. 29, 2011

(65) Prior Publication Data

US 2012/0027625 A1 Feb. 2, 2012

(30) Foreign Application Priority Data

Jul. 30, 2010 (EP) .................................... 10007979

(51) Int. Cl.
*F04B 49/00* (2006.01)
*F04D 15/00* (2006.01)
(Continued)

(52) U.S. Cl.
CPC ............ *F04D 15/0072* (2013.01); *F04B 49/02* (2013.01); *F04B 49/20* (2013.01);
(Continued)

(58) Field of Classification Search
CPC ... F04D 25/0666; F04D 15/0066; F04D 7/00; F04D 7/06; F04D 7/0606; F04D 13/00; F04D 13/0653; F04D 13/16; F04D 15/00; F04D 15/0254; F04D 15/0263; F04D 15/0072; F04D 15/0088; F04C 2240/81; F04C 2270/225; F04C 2270/605; F04C 2270/195; F04C 2270/90; F04C 14/08; F04C 2210/247; F04C 2210/208; F04C 2270/42; F04C 2270/44; F04C 2270/48; F04B 2205/09–2205/11; F04B 2205/04; F04B 2207/03; F04B 2207/041; F04B 2207/0411; F04B 2207/0412; F04B 2207/0413; F04B 2207/044; F04B 49/06; F04B 49/106; F04B 49/022; F04B 49/02; F04B 49/20; F24D 17/00; F24D 3/10; F24H 9/142; Y02B 30/108
USPC ......... 417/19, 20, 26, 32, 35, 36, 44.2, 43, 63
See application file for complete search history.

(56) References Cited

U.S. PATENT DOCUMENTS 4,691,796 A * 9/1987 Tanooka et al. ............... 180/422
6,030,359 A * 2/2000 Nowosielski ....... A61M 3/0241
604/131

(Continued)

FOREIGN PATENT DOCUMENTS

DE 29719056 U1 2/1998
EP 1 209 364 A2 5/2002

(Continued)

OTHER PUBLICATIONS

EP Search Report issued Dec. 15, 2010 in EP Application No. 10007979.7.

*Primary Examiner* — Peter J Bertheaud
*Assistant Examiner* — Dominick L Plakkoottam
(74) *Attorney, Agent, or Firm* — Panitch Schwarze Belisario & Nadel LLP

(57) ABSTRACT

The invention relates to a pump system comprising at least one pump unit, a control unit for controlling the pump unit and at least one sensor, wherein the sensor is connected to a data detection module which is spatially separate from the control unit and detects the output signals of the sensor, the data detection module comprises an output interface, at which it provides the detected sensor signals and/or data derived therefrom, and the control unit is provided with an input interface for the acquisition of signals or data from the output interface.

10 Claims, 15 Drawing Sheets

(51) Int. Cl.
*F04B 49/02* (2006.01)
*F04B 49/20* (2006.01)
*F24D 3/10* (2006.01)
*F24D 17/00* (2006.01)
*F24H 9/14* (2006.01)

(52) U.S. Cl.
CPC ........ *F04D15/0066* (2013.01); *F04D 15/0088* (2013.01); *F24D 3/10* (2013.01); *F24D 17/00* (2013.01); *F24H 9/142* (2013.01); *Y02B 30/108* (2013.01)

(56) References Cited

U.S. PATENT DOCUMENTS

| | | | | |
|---|---|---|---|---|
| 6,481,973 | B1* | 11/2002 | Struthers | F04D 7/045 417/36 |
| 6,538,261 | B1* | 3/2003 | McConnel | B67D 7/3272 137/565.16 |
| 6,904,341 | B2* | 6/2005 | Kish et al. | 701/21 |
| 6,931,305 | B2* | 8/2005 | Sherwood | 700/282 |
| 7,096,997 | B2* | 8/2006 | Appleby et al. | 184/3.1 |
| 7,806,347 | B2 | 10/2010 | Hanke et al. | |
| 8,200,368 | B2* | 6/2012 | Nickerson et al. | 700/284 |
| 9,103,344 | B2* | 8/2015 | Andresen | F04D 13/08 |
| 2002/0060631 | A1* | 5/2002 | Runge | G01W 1/00 340/602 |
| 2005/0288727 | A1* | 12/2005 | Penner | A61B 5/0031 607/32 |
| 2007/0202861 | A1* | 8/2007 | Adachi et al. | 455/414.2 |
| 2007/0274839 | A1* | 11/2007 | Moskun | 417/36 |
| 2008/0179416 | A1* | 7/2008 | Johnson et al. | 237/8 A |
| 2010/0089339 | A1* | 4/2010 | Krause | F24D 17/0078 122/19.1 |

FOREIGN PATENT DOCUMENTS

| | | |
|---|---|---|
| EP | 1898097 A2 | 3/2008 |
| GB | 2462143 A | 2/2010 |
| WO | 2007134454 A1 | 11/2007 |
| WO | 2008091970 A2 | 7/2008 |

* cited by examiner

Fig.15

|   | M1 | M2 | M3 | M4 |
|---|----|----|----|----|
| A | 4  | 1  | 2  | 3  |
| B | 4  | 1  | 2  | 3  |
| C | 4  | 1  | 2  | 3  |
| D | 4  | 1  | 2  | 3  |
| E | 4  | 1  | 2  | 3  |
| F | 4  | 3  | 1  | 2  |

PUMP SYSTEM

The invention relates to a pump system according to the preamble of claim 1.

In particular in heating installations, pump systems are provided which comprise at least one pump unit, a control unit for controlling the pump unit, and at least one sensor, wherein the control unit controls the pump unit as a function of measured values obtained by the sensor. For example, a pump system can thus be used to convey a heating medium, as required, in a home or in a heating installation.

More complex pump systems are required in more complex heating installations and often have to access measured values of a plurality of sensors. Sensors and pump units are also not always arranged in direct spatial vicinity. This leads to an installation cost which is not insignificant in order to connect the sensors to the control unit and said control unit to the pump unit.

The object of the invention is therefore to provide an improved pump system, in particular a pump system which is provided for use in a heating installation, is easy to install and start up.

This object is achieved by a pump system having the features disclosed in claim 1. Preferred embodiments emerge from the dependent claims, the description below and the accompanying drawings.

The idea according to the invention lies in not connecting a required sensor or required sensors directly to the control unit for controlling the pump unit, but in providing a data detection module separated spatially from the control unit. This data detection module detects the output signals of the sensor or a plurality of sensors. The control unit can then access the data detected and collated by the data detection module. This is particularly advantageous if a plurality of sensors is provided, since the output signals thereof can thus be collated centrally in the data detection module and then transmitted or provided to the control unit via a single interface between the data detection module and the control unit. Each individual sensor therefore no longer has to communicate directly with the control unit.

In order to allow this, the data detection module comprises an output interface at which it provides the detected sensor signals and/or data derived therefrom. This means that the data detection module can provide at the output interface either the detected sensor signals in a form which has not been subject to further processing, or the output signals of the sensor may already have been processed in the data detection module. Processed output signals or data derived from the output signals of the sensors can thus be provided at the output interface. It is thus possible to provide data processing which adapts the output signals, for example, to the standard of the output interface, or possibly also processes them in such a way that only relevant data is forwarded on to the output interface.

The control unit, for its part, comprises an input interface for acquiring signals or data from the output interface. In other words, a communication takes place between the output interface of the data detection module and the input interface of the control unit, as a result of which data or signals from the sensors collated in the data detection module and processed if necessary are transferred to the control unit.

The indirect connection of the sensors to the control unit further affords the advantage that a wide range of sensors can communicate with the control unit in a simple manner, without the control unit having to be designed specifically for the connection of these sensors. Rather, the data detection module can collate the output signals and provide these at a standardised interface which can be accessed by the control unit.

The at least one sensor is preferably connected to the data detection module via a cable. This may preferably be an electrical connection line, or else an optical waveguide, for example. Furthermore, a wireless connection of one or more sensors to the data detection module is possible, for example via air interfaces. In particular with the connection via cable, however, there is the advantage that for connecting the sensors these do not have to be connected directly to the control unit and therefore no individual connection points for the sensors have to be provided in the control unit. This simplifies the structure of the control unit and makes it possible, in addition, to more easily integrate the control unit for the pump system in other modules or control systems in which connection points for sensors can only be provided with difficulty.

The control unit is preferably used, for example, to switch the pump unit on and off, but in the case of a controlled pump the speed of the pump unit can also be regulated or controlled in order to adjust the flow rate as required. This may occur on the basis of input signals which are supplied by the at least one sensor and/or on the basis of other parameters if necessary.

The output interface of the data detection module and the input interface of the control unit can be interconnected via a data line, i.e. an electrical or optical data line. Furthermore, it would also be conceivable for both to be connected to a data network which, if necessary, also produces a connection to further components. However, the output interface and the input interface are particularly preferably formed as wireless interfaces, in particular as air interfaces. This allows a particularly simple connection of the data detection module to the control unit, since no connection via connection lines is necessary. Assembly is thus simplified on the one hand. On the other hand, it is also possible to encapsulate the data detection module and, in particular, the control unit tightly in a housing without difficulty, which is advantageous in pump systems, which are often used in humid environments. The air interfaces can thus be designed in such a way that they automatically find and couple to one another. It is possible to provide coupling procedures in the air interfaces which make it possible to couple the interfaces of the data detection module and the control unit for communication with one another.

The control unit is particularly preferably integrated, at least in part, in the pump unit. In other words, the control unit forms a part of the pump unit. It is integrated, at least in part, in the control electronics of the pump unit or forms the control electronics of the pump unit.

Such a control unit can particularly preferably also control further pumps or system components, for example valves, via corresponding communication interfaces. These are likewise preferably formed as air interfaces. In particular with the integration of the control unit in the pump unit, the use of the data detection module is of great advantage, since a connection of one or more sensors to the pump unit by means of electrical connection lines is therefore not necessary. There is often little installation space in a pump unit and therefore additional connection plugs or connection terminals for the connection of sensors can only be placed with difficulty. Furthermore, it is even preferable in the pump unit to encapsulate the control or regulation electronics tightly so that the function thereof is not impaired by moisture from the environment or from the conveying chamber of the pump unit. For this reason it is desirable to provide on the pump unit minimal connection terminals or connection plugs and housing ducts to be sealed. Pump units further comprise mechanical components which are subject to wear or require servicing. If a pump unit is to be replaced, it is thus advantageous if the electrical and control connection to further system components is as simple as possible so that such a pump unit is easily assembled and, if necessary, easily replaced. Furthermore, by reducing the connection points the risk of faults at connection points is minimised. With use of the data detection module, the connection point of the at least one sensor is not impaired when the pump unit is replaced, since the communication connection between the data detection module and the sensor does not have to be interfered with at all in order to replace the pump unit. Merely the coupling or connection of the pump unit to the data detection module has to be produced again, which can preferably take place automatically by a corresponding communication protocol or else manually so as to produce a communication connection, preferably via radio, between the two components.

As described, a plurality of sensors are particularly preferably connected to the data detection module, and the data detection module provides the sensor signals of a plurality or all of the sensors and/or data derived therefrom to the output interface for transfer to the input interface of the control unit. In other words, the data detection module collates all sensor signals and provides them at an interface for transfer. Since the control unit only has to communicate via this one interface, which is formed by the input and output interface, this communication is simplified.

More preferably, the control unit, the input interface thereof and the output interface are designed in such a way that the control unit accesses via the input interface from the output interface merely data or signals currently required by the control unit. In other words, not all signals or data provided or processed by the data detection module are always transferred from the output interface to the input interface. Rather, the control unit accesses via the input interface only those signals or data which are currently required to run a control or regulation program. The data transfer between the output interface and the input interface is thus minimised.

The pump unit is preferably a circulating pump unit, in particular a heating circulating pump unit. The circulating pump unit or the pump system is provided for integration in a heating installation, for example for the heating of service water or for the heating of a building. The circulating pump unit preferably comprises a wet-running electric drive motor.

In accordance with a further particular embodiment, the control unit is designed to control a plurality of pump units and/or valves, for which purpose the control unit can communicate via a corresponding interface, which may be wireless or wire-connected, with these further components. The pump unit or valves controlled by the control unit may, if necessary, also provide state quantities or measured values or sensor signals for the control unit for the control thereof. This may take place via direct communication, but possibly also via communication via the data detection module. It is also conceivable that the communication between the input interface and the output interface is bidirectional, in such a way that further components, sensors, valves, further pumps, etc., which are connected to the data detection module, can be controlled by the control unit via this interface.

As described above, the control unit is preferably integrated in the pump unit and comprises a communication interface for communication with further pump units for the control or regulation thereof. This may be a unidirectional or bidirectional communication. The communication interface is particularly preferably designed as an air interface. On the one hand this allows a simple structure or a simple installation of the pump system, since the number of line connections to be provided is minimised. On the other hand a communication over greater distances is possible without difficulty, for example between pump units which are arranged in different parts of a building.

The at least one sensor is preferably a temperature, absolute pressure, differential pressure and/or volume flow rate sensor. It can also be a combined sensor which detects both, temperature and a pressure or differential pressure and/or volume flow rate. A volume flow rate sensor may preferably be formed as a vortex sensor, in which the actual sensor element is likewise a pressure or differential pressure sensor which detects the turbulences generated by an obstruction in the line.

The pump system is particularly preferably part of a service water heating device. Such a service water heating device is used to generate hot service water in a heating installation, which hot service water is provided, for example, to wash basins, showers, bathtubs, etc. in a building. Such a service water heating device may preferably comprise a heat exchanger, via which the service water is heated by a heating medium. The pump unit may be used to convey this heating medium in order to feed heating medium to the heat exchanger as required when service water has to be heated. For this purpose the control unit may access, for example, a signal of a temperature or volume flow rate sensor which is arranged in the service water line. Such a sensor can detect a service water flow, which signals that hot water is drawn. Hereupon, the control unit can start up the pump unit in order to feed heating medium to the heat exchanger to heat the service water. Furthermore, it is also possible that the pump unit is speed-controlled and the control unit adjusts the speed and therefore the flow rate of the pump unit as required, in such a way that the amount of heating medium fed to the heat exchanger is varied as a function of measured values which are obtained by one or more sensors connected to the data detection module. For example, these may be the temperature of the heating medium, the volume flow rate in the service water circuit and/or else the temperature of the cold service water to be heated.

The invention will be described hereinafter by way of example with reference to a service water heating device in which a pump system according to the invention is integrated. The description is given with reference to the accompanying drawings, in which.

Figure 1:
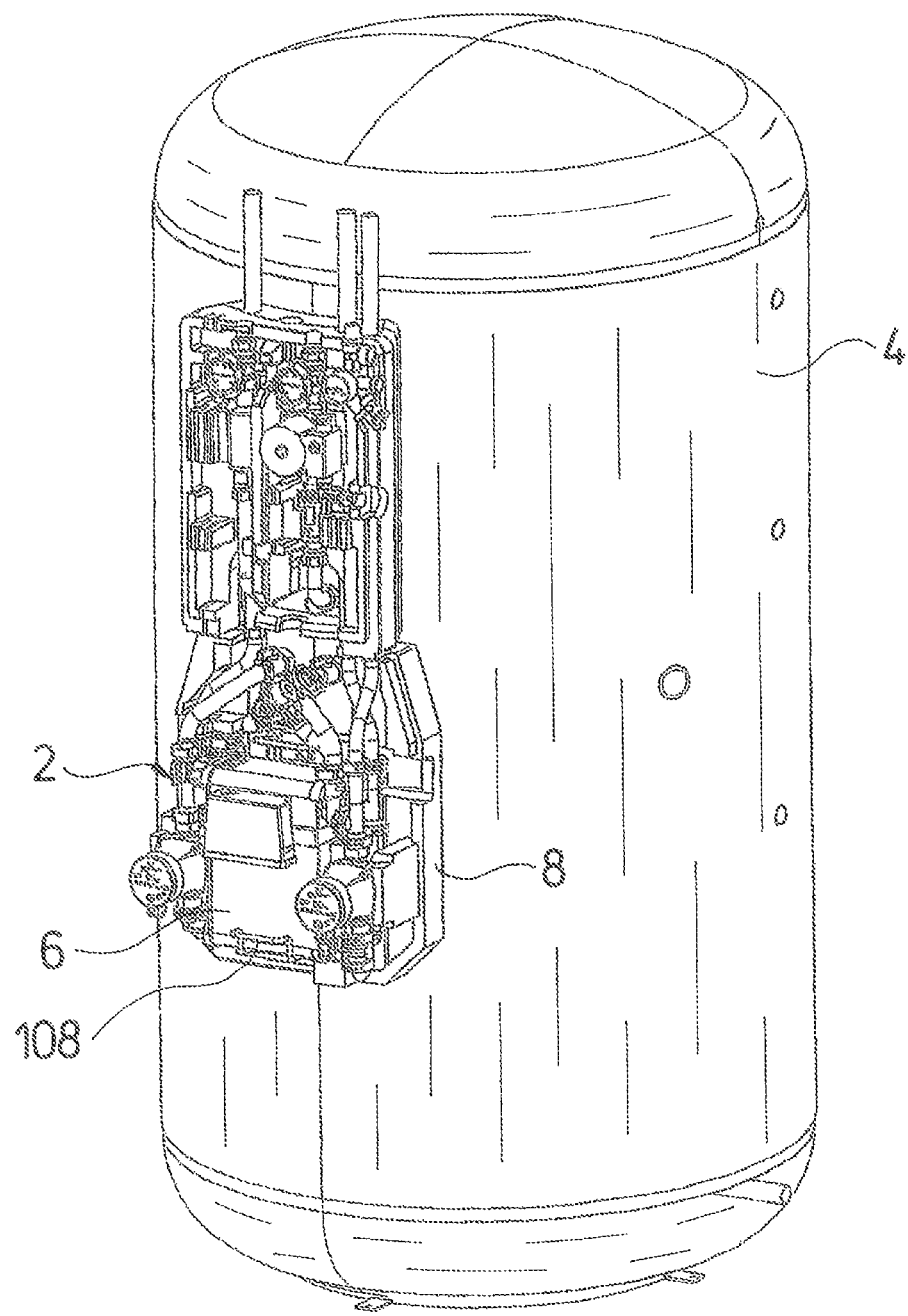
FIG. 1 shows an overall view of a service water heating unit arranged on a heat accumulator.
Figure 2:
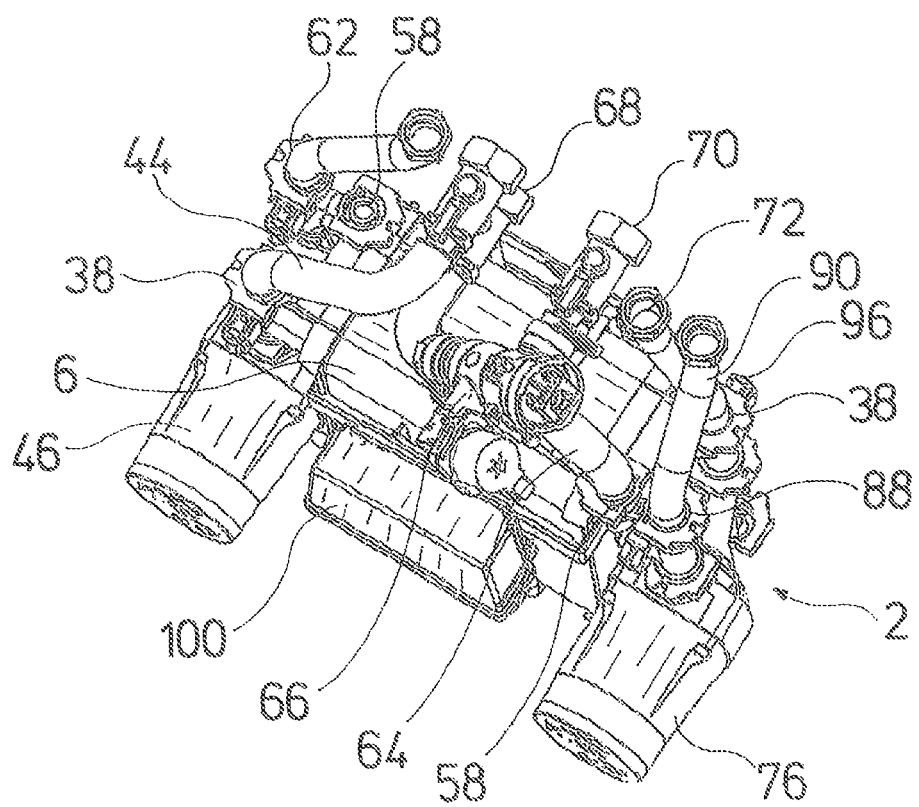
FIG. 2 shows a perspective overall view of the service water heating unit according to FIG. 1.
Figure 3:
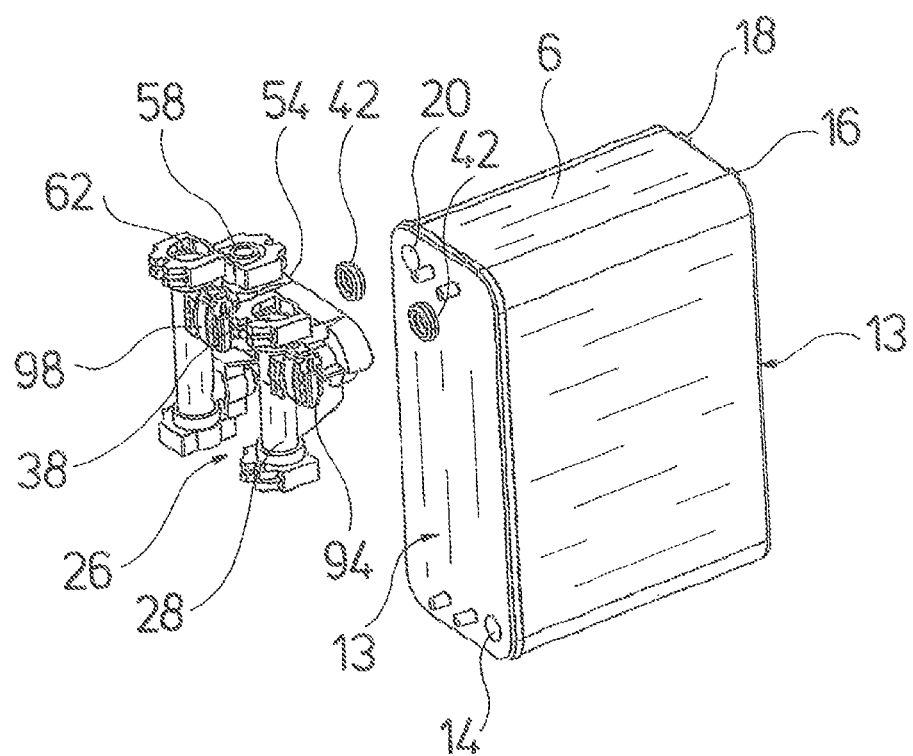
FIG. 3 shows a perspective view of the heat exchanger comprising a connector.
Figure 4:
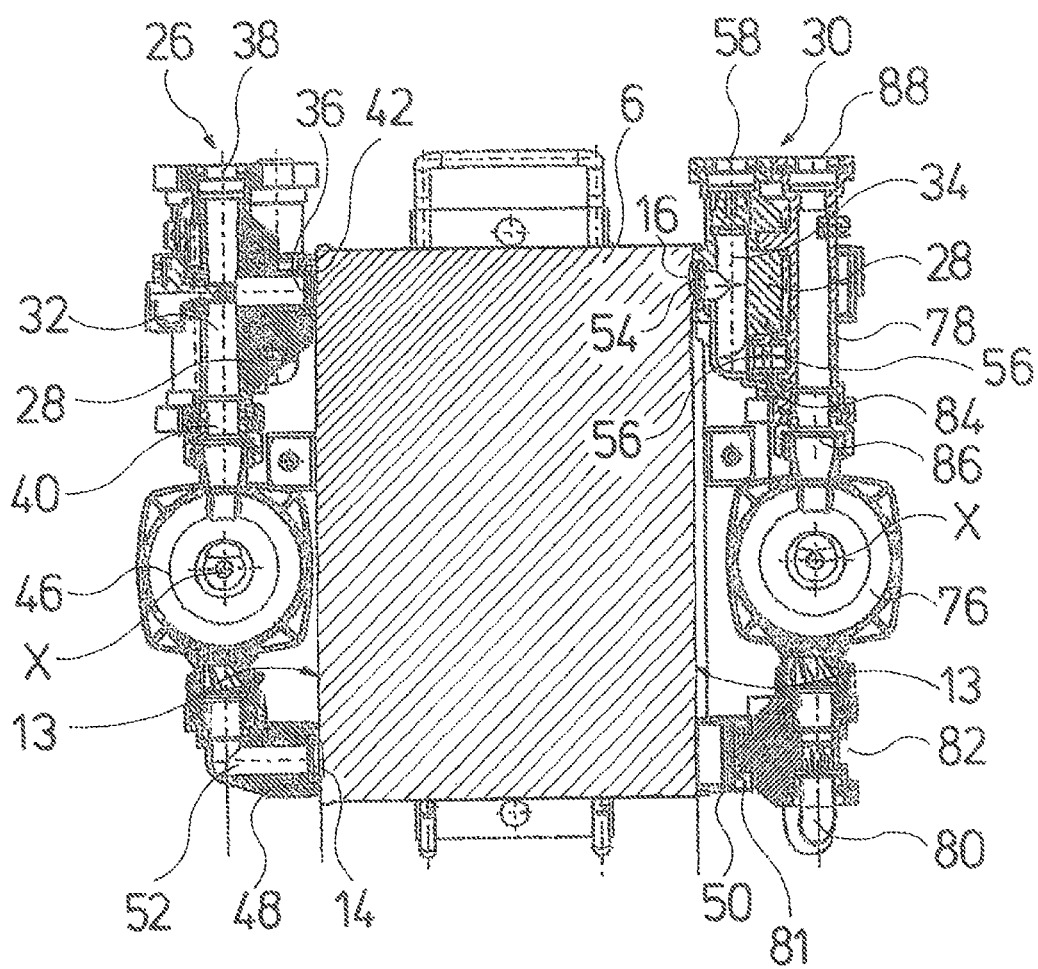
Figure 5:
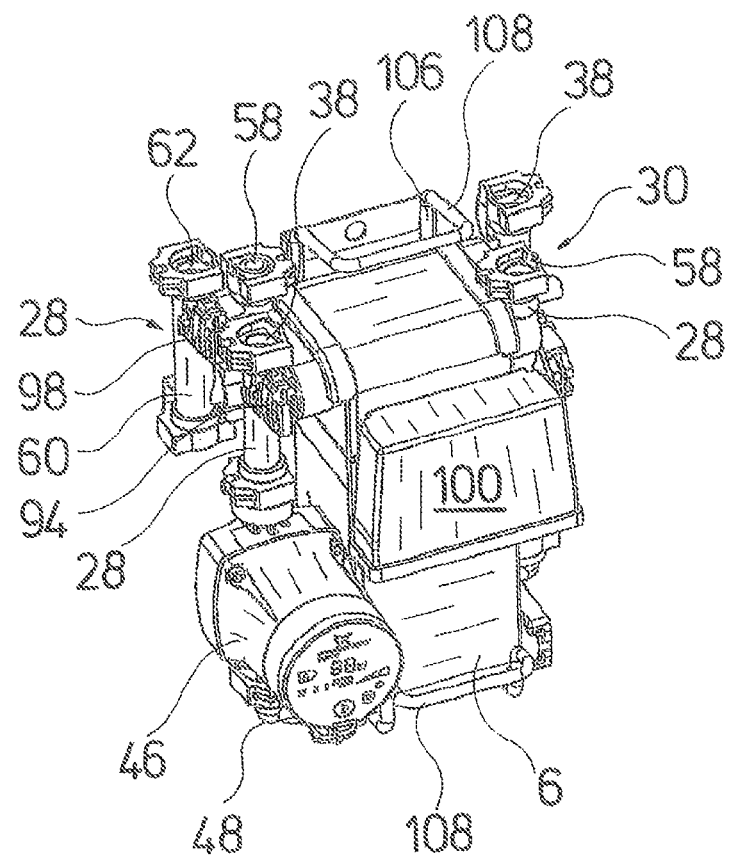
Figure 6:
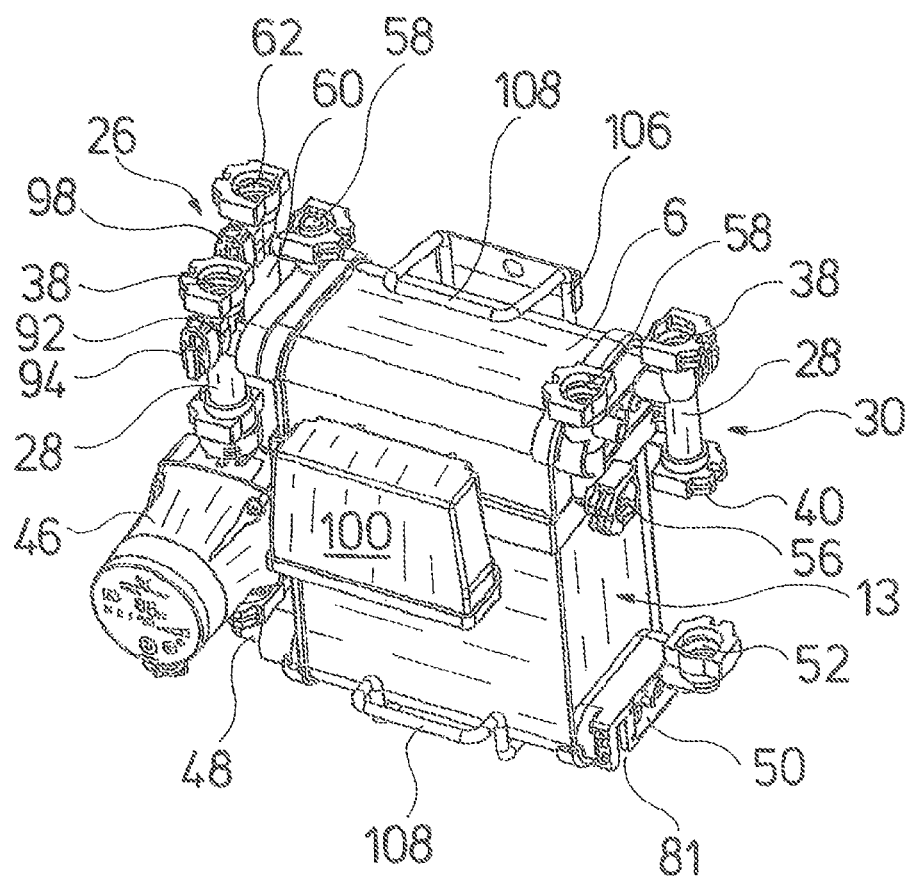
Figure 7:
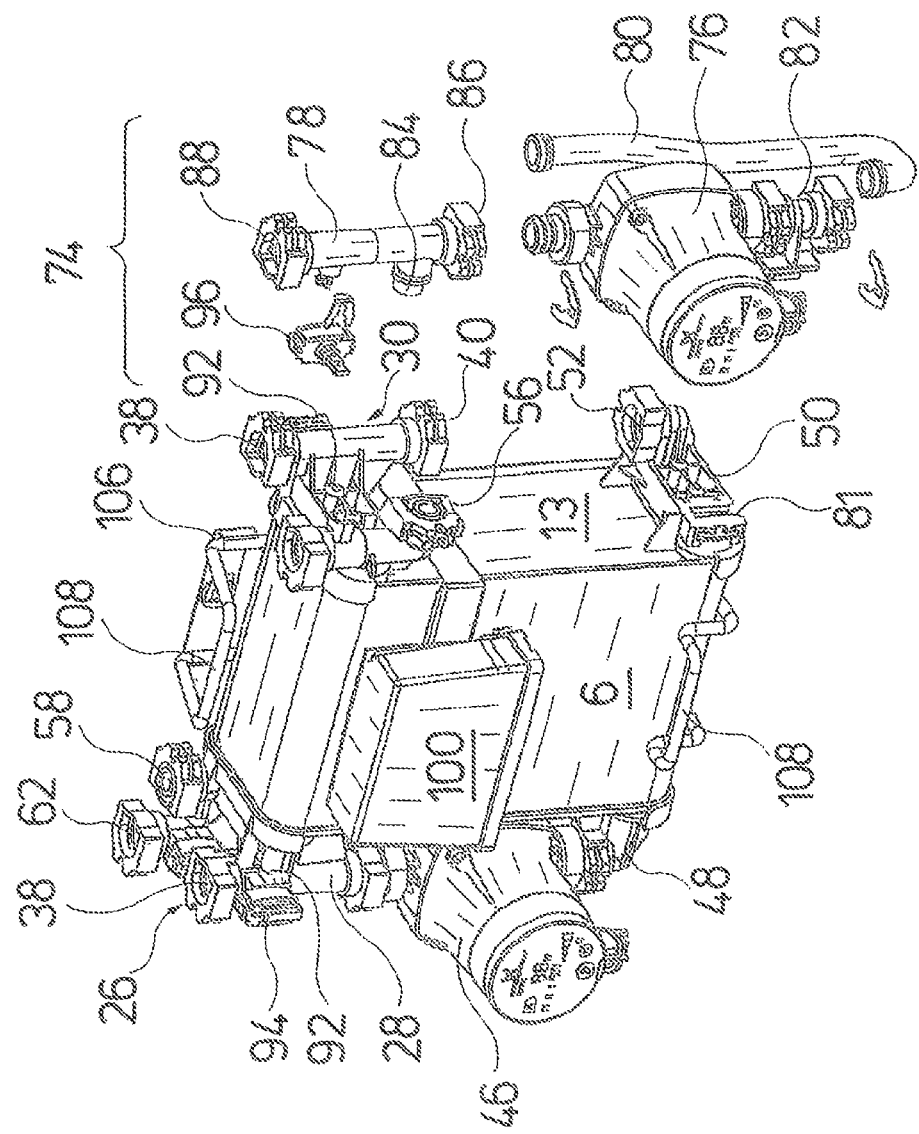
Figure 8:
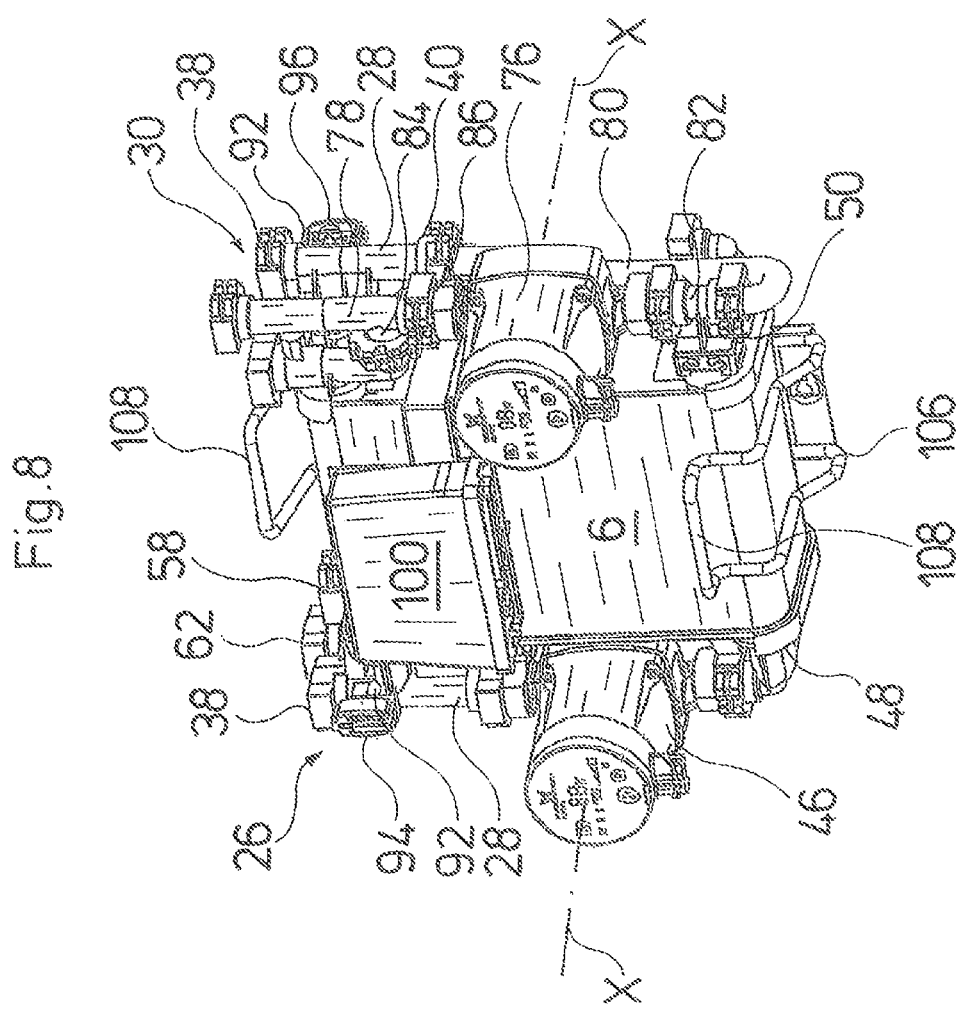
Figure 9:
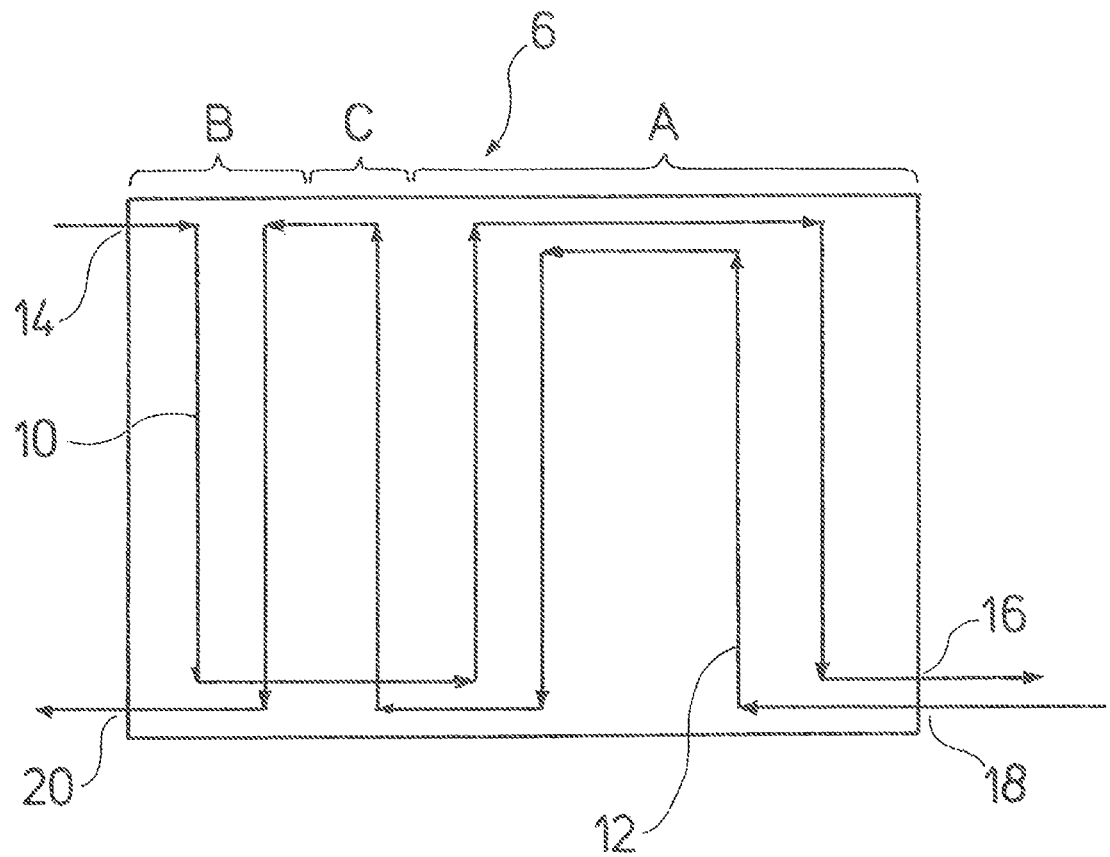
Figure 10:
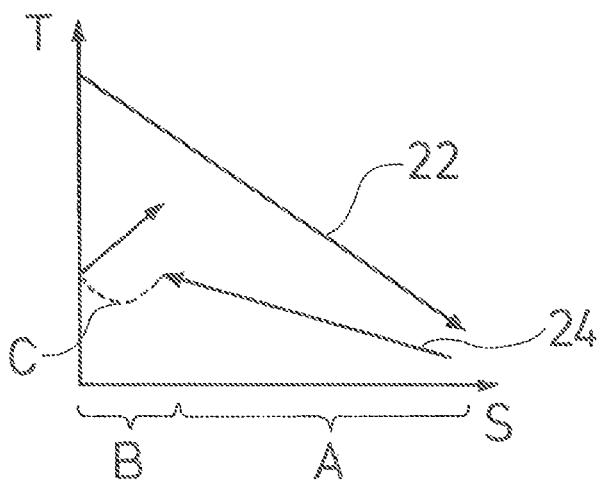
Figure 11:
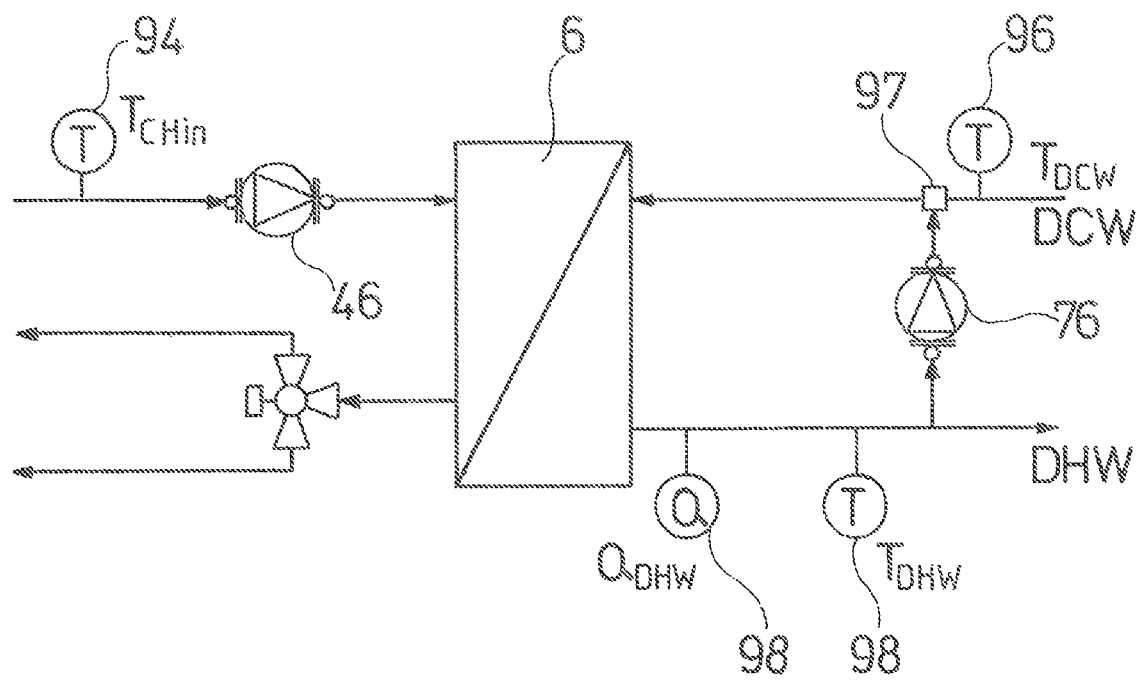
Figure 12:
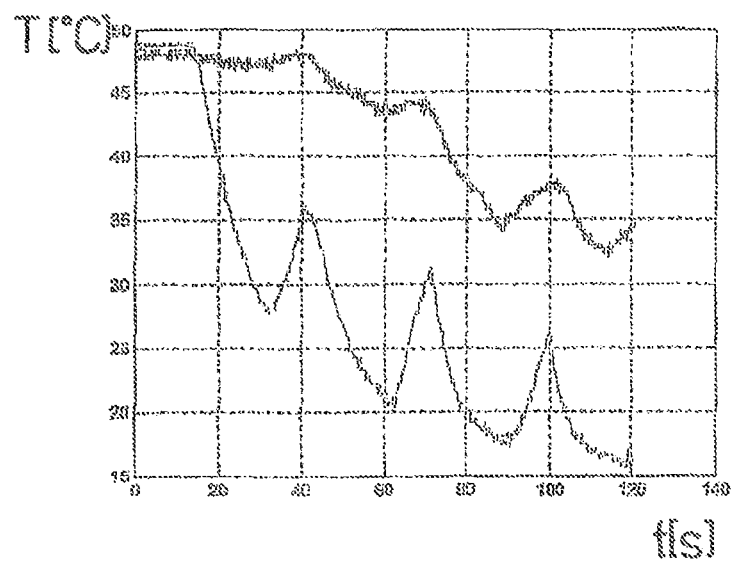
Figure 13:
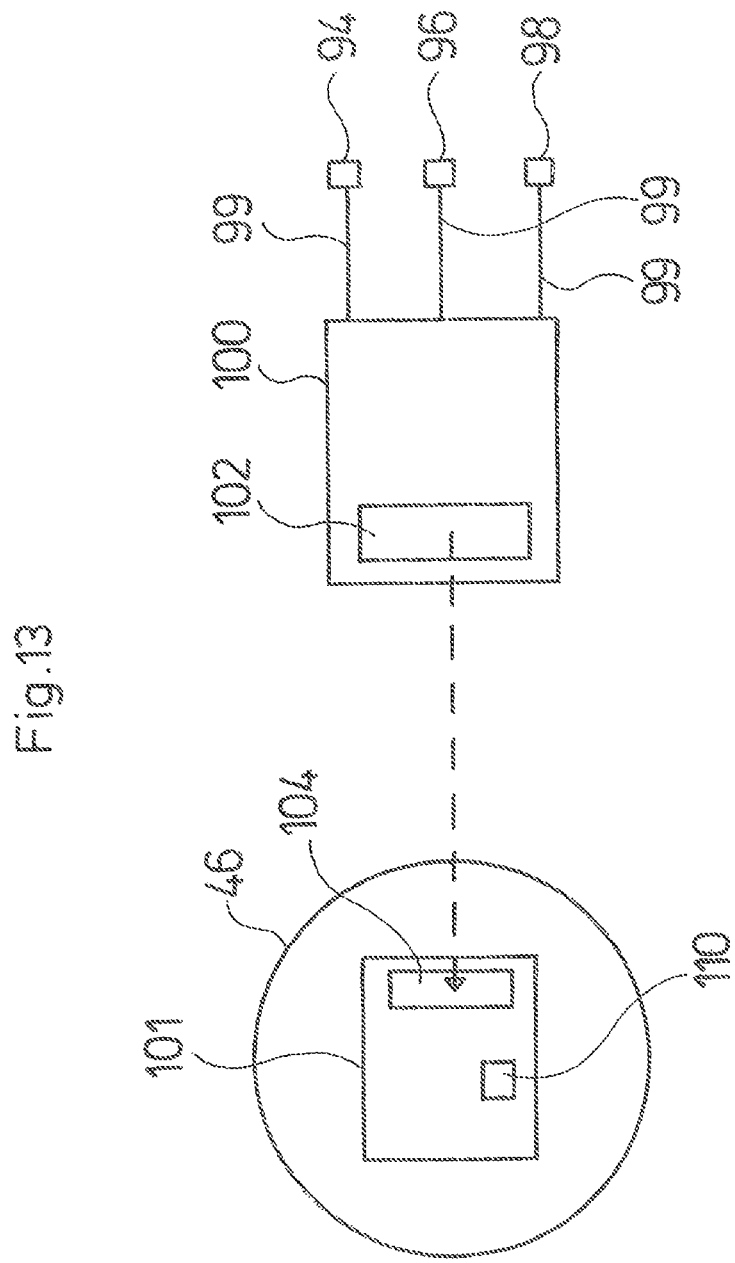
Figure 14:
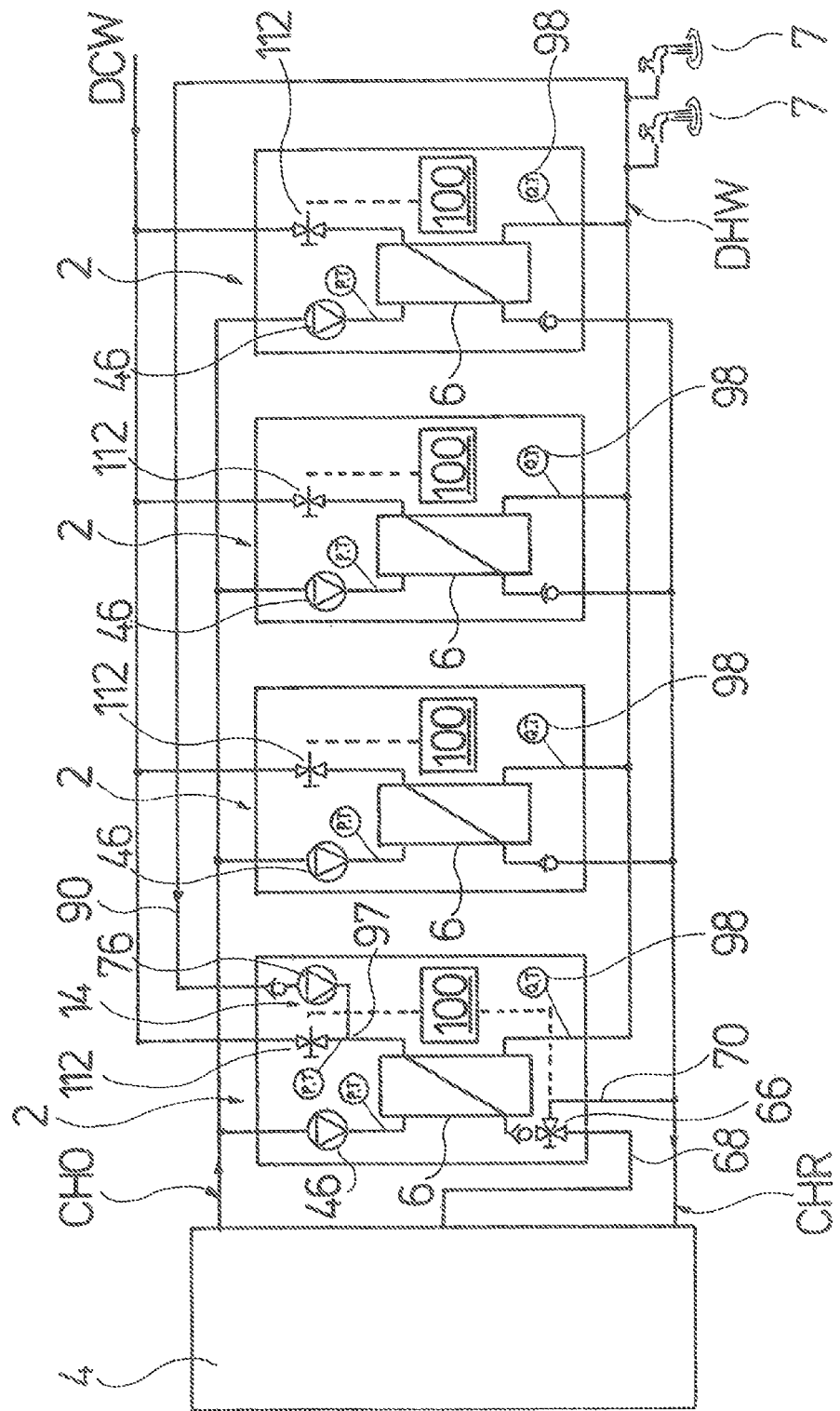
Figure 16:
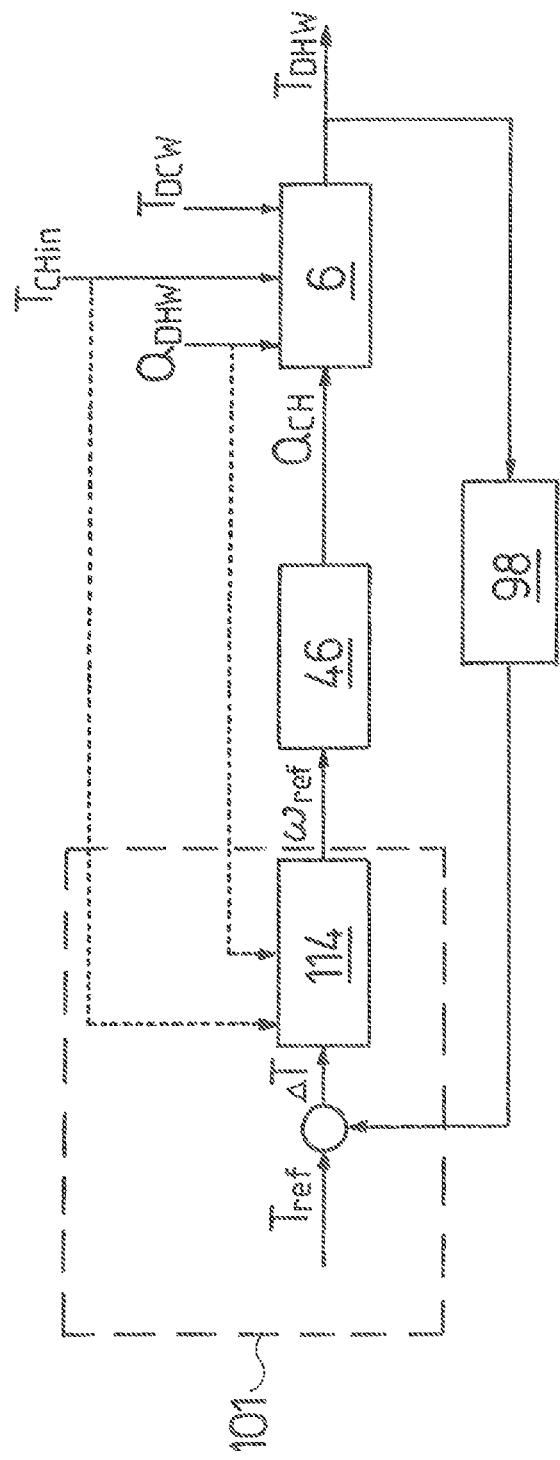

FIG. 4 shows a sectional view of the service water heating unit according to FIG. 2, FIGS. 5 and 6 show a service water heating unit according to FIGS. 1, 2 and 4 without a service water circulation module, FIG. 7 shows a perspective exploded view of the service water heating unit with a service water circulation module, FIG. 8 shows a perspective view of the service water heating unit with an assembled service water circulation module, FIG. 9 shows a schematic view of the flow paths inside the heat exchanger according to FIG. 3, FIG. 10 shows the temperature curve inside the heat exchanger over the flow path, FIG. 11 shows a hydraulic circuit diagram of a service water heating unit, FIG. 12 shows the temperature curve which is detected by a temperature sensor in the cold water inlet of the service water heating unit, FIG. 13 shows a schematic view of the data transfer from the sensors to a control device, FIG. 14 shows the arrangement of a plurality of service water heating units 2 in a cascade arrangement, FIG. 15 shows a schematic view of the control of the plurality of service water heating units according to FIG. 14, and FIG. 16 shows a schematic view of a control circuit for controlling the service water heating units.

The heat exchanger unit described hereinafter comprises a pump system including the pump unit or circulating pump 46 and, if necessary, the circulating pump 76, which are controlled or regulated by a control unit 101 on the basis of the measured values of different sensors. In accordance with the invention the sensors are connected to the control unit via a data detection module.

The heat exchanger unit shown as an example is a service water heating unit 2 and is provided for use in a heating installation. In the example shown here (FIG. 1), the service water heating unit 2 is mounted on a heat accumulator 4, for example a water store, which stores heating water heated by a solar installation. The heat exchanger 6 of the service water heating unit 2 is supplied with heating medium from the heat accumulator 4 to heat service water. In FIG. 1 a housing surrounding the service water heating unit 2 is illustrated in the open position, i.e. the front cover is removed. In the other figures the service water heating unit 2 is illustrated without a surrounding housing.

The central component of the heat exchanger unit or service water heating unit 2 is a heat exchanger 6 in the form of a plate heat exchanger. Service water to be heated is heated via the heat exchanger 6 and discharged as heated service water, for example in order to supply tap points 7 of wash basins, showers, bathtubs, etc. in a house with hot service water. The heat exchanger is supplied with heating medium in order to heat the service water. Said heat exchanger is provided, internally, with two flow paths, as illustrated schematically in FIG. 9. A first flow path 10 is the flow path through which the heating medium is guided through the heat exchanger. The second flow path 12 is the flow path through which the service water is conveyed through the heat exchanger. Both flow paths are separated from one another in a manner known per se by plates, via which a heat transfer from the heating medium to the service water is possible.

The two outer plates 13 of the plate stack form two mutually opposed side faces of the heat exchanger 6. The fluid connection points 14 to 20 of the heat exchanger 6 are formed on these side faces and connectors are fastened there, as described below.

The heating medium passes through the inlet 14 into the heat exchanger 6 and exits again through the outlet 16. The service water to be heated enters into the heat exchanger 6 at the inlet 18 and exits again from the heat exchanger at the outlet 20. As is shown schematically in FIG. 9, the heat exchanger is divided into three portions A, B and C. In the direction of flow of the service water through the second flow path 12, portion A forms a first portion in which the first flow path 10 and the second flow path 12 pass by one another in countercurrent. This means, the service water to be heated and the heating medium flow in opposite directions past the plates of the heat exchanger separating them. The effect of this is that the cold service water, which enters into the heat exchanger 6 at the inlet 18, is first heated by the heating medium, which has already been cooled, emergent at the outlet 16 and then passes in the direction of flow into the vicinity of increasingly hotter heating medium. The heat exchanger 6 comprises a second portion B in which the first flow path 10 and the second flow path 12 are no longer guided relative to one another in a countercurrent arrangement, but are guided in a co-current arrangement, i.e. the flows in the first flow path 10 and in the second flow path 12 run parallel in the same direction along the plates separating them or other heat-conducting separation elements separating them.

A reverse portion C is formed between the first portion A and the second portion B, in which reverse portion the relative reversal of the directions of flow in the flow paths to one another is carried out. In the example shown here the portions A, B and C of the heat exchanger are integrated in one heat exchanger. However, it is to be understood that the portions A and B could also be formed in separate heat exchangers and the direction reversal of the flows to one another in portion C could be achieved by a corresponding piping between the two heat exchangers. Owing to the reversal to the co-current principle, the service water is prevented from being overheated since the heated service water emergent at the outlet 20 is not heated in the last portion of its flow path 12 directly by the hot heating medium entering at the inlet 14, but by heating medium which has already been cooled slightly. The maximum service water temperature to be achieved is thus limited. This can be seen in FIG. 10. In the diagram shown in FIG. 10 the temperature T of the heating medium is plotted as a curve 22 over the path S and the temperature T of the service water is plotted as a curve 24 over the path s. It can be seen that the outlet of the service water does not lie in the region of the highest temperature of the incoming heating medium, and in this regard a maximum temperature can be achieved which lies at the level of the temperature of the heating medium in the region of the outlet 20 of the service water from the heat exchanger.

The inlet 14 for the heating medium, the outlet 16 for the heating medium, the inlet 18 for the service water to be heated and the outlet 20 for the heated service water are formed on the plate heat exchanger 6 as fluid connection points, on which connectors are placed in turn and produce the connection to further component parts and pipelines. A first connector 26 is placed on the outlet 20 for the heated service water. This connector comprises a base element 28 which, in an identical configuration in the second connector 30 but merely rotated through 180°, is placed on the fluid connection points of the heat exchanger 6 forming the outlet 16 and the inlet 18. This affords the advantage that the same base element 28 can be used as a first connector and as a second connector and the number of different parts can be reduced.

Two separate flow ducts 32 and 34 are formed in the base element 28. The flow duct 32 is T-shaped and opens into three connection openings 36, 38 and 40 (see the sectional view in FIG. 4). When using the base element 28 as a first connector 26, the connection opening 36 is unused and closed by the wall of the heat exchanger 6, a seal 42 for sealing being arranged at the connection opening 38 between the base element 28 and the wall of the heat exchanger 6. The connection opening 38 forms the connection point for connecting to a feed line 44 which is connected to the heat accumulator 4 for supplying hot heating medium. At the connection opening 40 of the flow duct 32 arranged opposite, a first circulating pump 46 is arranged on the base element 28 during use in the first connector 26 and feeds the heating medium to the inlet 14 of the heat exchanger 6. For this purpose a third connector 48 is arranged on the inlet 14 and can be arranged, in an identical configuration but merely rotated through 180°, on the opposite side of the heat exchanger 6, as described below, as a fourth connector 50. This means, the third connector 48 and the fourth connector 50 are also formed at least of an identical base element.

A flow duct 52 is formed in the third connector 48 and connects the pressure connection of the circulating pump 46 to the inlet 14 of the heat exchanger.

As can be seen in the sectional view with reference to the second connector 30, the second flow duct 34 in the base element 28 is likewise T-shaped and comprises three connection openings 54, 56 and 58. The connection opening 58 of the second flow duct 34 is closed in the first connector 26, for example by an inserted stopper. The connection opening 54 is connected to the outlet 20 of the heat exchanger 6, a seal 42 likewise being arranged between the connector 26 and the heat exchanger 6. In the first connector 26 a connection part 60 is placed on the connection opening 56 of the second flow duct 34 and connects the connection opening 58 to the line connection 62 via a flow duct formed inside the connection part 60. The line connection 62 connects to a hot water line, through which the heated service water is removed.

The base element 28 is placed as a second connector 30 on the opposite end face of the plate heat exchanger 6, which forms the bearing structure of the service water heating unit. The outlet 16 for the heating medium and the inlet 18 for the cold service water are connected to the external installation by the second connector 30. With this arrangement of the base element 28 rotated through 180°, the connection opening 54 of the second flow duct 34 connects to the outlet 16 of the heat exchanger. This second flow duct 34 produces a connection to the line connection or connection opening 58, which forms the outlet of the cooled heating medium. A line can be connected to this connection opening 58 and guides the heating medium back into the heat accumulator 4. In the embodiment shown in FIG. 2, in which, as will be described below, a circulation of the service water is simultaneously provided, a line 64 is connected to the connection opening 58 and leads to a switching valve 66, which selectively produces a connection of the line 64 to the connection points 68 and 70. The connection points 68 and 70 connect to the heat accumulator 4, wherein these connection points can produce, for example, a connection to the inside of the heat accumulator 4 at different vertical positions so that, depending on the temperature of the heating medium emergent from the heat exchanger 6, said heating medium can be fed back into the heat accumulator 4 at different vertical positions by switching the switching valve 66 so as to maintain a layered arrangement of the heating medium in the heat accumulator. In particular, the switching function is advantageous if, as described below, a service water circulation module 74 is provided. The heating of the circulated service water requires a lower heat demand and therefore the heating medium flows back into the heat accumulator 4 at a higher temperature.

The flow path 32 inside the base element is connected at the second connector 30 to the inlet 18 by means of the connection opening 36. A cold water line 42 for feeding the cold service water is connected to the connection opening 38. The cold water enters the inlet 18 through this line and enters the heat exchanger.

The service water heating unit shown here can be used in two different embodiments, namely with a service water circulation module 74 or else without said service water circulation module 74. In FIGS. 1, 2, 4, 7 and 8 this service water circulation module 74 is arranged on the heat exchanger 6. FIGS. 5 and 6 show the arrangement without the service water circulation module 74. If the service water circulation module 74 is not provided, the fourth connector 50 is not necessary and the connection opening 40 or line connection 40 of the base element 28 of the second connector 30 is closed by a stopper. In this case, the connection opening 56 of the flow duct 34 is closed by a stopper.

The service water circulation module 74 consists of a second circulating pump 76, which circulates the service water in the hot water line system of a building. A connection part 78 and a pipe 80 are provided for connection of the second circulating pump 76. In order to mount the pump 76 on the heat exchanger 6, a fourth connector 50, for this purpose, is arranged on the end of a side face and is identical to the third connector 48 or comprises an identical base element. However, when used as a fourth connector 50, the flow duct 52 is redundant. A seat 81 is formed in the base element of the third and fourth connectors, into which seat a connection element 82 is inserted which is connected to a pressure connection of the circulating pump 76. The connection element 82 comprises, internally, a flow duct and thus produces a connection to the pipe 80. The pipe 80 is connected at its end remote from the connection element 82 to the connection opening 40 of the flow duct 32 in the second connector 30, the connection opening 40 then not being closed by a stopper. The circulating pump 46 serving as a circulation pump can thus guide some of the heated service water back into the flow duct 32 of the second connector 30 and, through the connection opening 36 thereof, into the inlet 18 of the heat exchanger. This means, fed cold service water flowing through the connection opening 38 and service water fed back by the circulation pump 76 through the connection opening 40 flow together in the flow duct 32 of the second connector.

The connection part 48 is placed on the base element 28 of the second connector 30 in such a way that it engages in the connection opening 56 of the second flow duct 34 by a closed connecting piece 84 and thus closes the connection opening 56 in such a way that an additional stopper is no longer necessary to close said connection opening in the second connector 30. For the rest, the connection part 78 is tubular and connects two connection openings 86 and 88 located at opposite ends. The connecting piece 84 does not comprise a fluid connection to the connection between the line connections and connection openings 86 and 88. The connection opening 86 is connected to the intake connection of the second circulating pump 76 and the connection opening 88 forms a connection point to which a circulation line 90 is connected. By using the connection part 78 and a fourth connector 50, of which the base element is identical to the third connector 48, a second circulating pump 76, which constitutes a circulation pump, can likewise thus be fastened, with few additional parts, to the heat exchanger 6 serving as a bearing structure, and the circulation line can be directly connected, in fluid communication, to the second flow path 12 inside the heat exchanger via the circulating pump 46.

A sensor holder 92 is formed in the flow duct 32 in the base element 28 of the first and second connectors 26 and 30 and can be used to accommodate a sensor. When the base element 28 is used as a second connector 30, the sensor holder 92 is closed if no service water circulation module 74 is assembled.

A temperature sensor 94 is placed in the sensor holder 92 in the first connector 26 and detects the temperature of the heating medium fed to the heat exchanger 6. With use of the service water circulation module 74, a temperature sensor 96 is also placed in the sensor holder 92 of the base element 28 of the second connector 30 and detects a service water demand, the specific functioning of this temperature sensor being described below. Furthermore, the connection part 60 also comprises a sensor holder in which a sensor 98 is placed. The sensor 98 is a combined temperature and flow sensor which detects the temperature and flow rate of the heated service water emergent from the outlet 20 from the heat exchanger 6 via the flow path 34 in the first connector 26. It is to be understood that the temperature sensors 94, 96 described above could also be used as combined temperature and flow rate sensors if necessary.

Owing to the sensor 98, the temperature of the emergent service water can be detected and, based on this temperature and on the temperature of the heating medium detected by the temperature sensor 94, the necessary volume flow rate of the heating medium can be determined and the first circulating pump 46 can be operated accordingly. The control or regulator for the circulating pump 46 necessary for this is preferably integrated into the circulating pump 46 as regulating or control electronics.

The sensors 94, 96 and 98 are connected via electrical lines 99 to a sensor box 100 which forms a data detection module. The sensor box 100 detects the data provided by the sensors 94, 96 and 98. As shown in FIG. 13, the sensor box 100 makes available the detected data of the control unit 101, which is integrated in this example into the control electronics of the pump unit 46. For this purpose an output interface 102 is provided in the sensor box 100 and a corresponding input interface 104 is provided in the control unit 101. The output interface 102 and the input interface 104 are formed, in this instance, as air interfaces which enable a wireless signal transmission from the sensor box 100 to the control unit 101 in the pump unit 46. This enables a very simple connection of the pump unit 46 and also of the sensors 94, 96 and 98, since these do not have to be connected directly to the pump unit 46. The sensors 94, 96 and 98 can thus be connected and wired independently of the circulating pump 46, and the circulating pump 46 can also be easily replaced, if necessary, without interfering with the wiring of the sensors. The control unit 101 in the circulating pump 46 preferably controls and regulates not only the circulating pump 46, but also the circulating pump 76, for which purpose the control unit 101 in the circulating pump 46 can communicate, preferably likewise wirelessly via radio, with the circulating pump 76 and the control device thereof. Both circulating pumps 46 and 76 can thus be connected very easily since only one electric connection is necessary for the mains power supply. The control communicates in a completely wireless manner.

Signal conditioning of the signals supplied by the sensors 94, 96 and 98 may also take place in the data detection module 100 or the sensor box 100 in order to provide the necessary data to the control device 101 in a predetermined format. The control unit 101 preferably reads from the output interface 102, via the input interface 104, only the data currently required for the control and therefore the data communication can be confined to a minimum.

The control unit 101 preferably also controls the circulation effected by the circulating pump 76 with use of the service water circulation module 74, in such a way that the circulating pump 76 is switched off for circulation when the temperature sensor 94 detects a temperature of the heating medium fed from the heat accumulator 4 which lies below a predetermined threshold value. The heat accumulator 4 can thus be prevented from cooling excessively owing to the service water circulation, and the circulation can instead be interrupted at times at which the heat supply to the heat accumulator 4 is too low, for example owing to a lack of solar irradiation on a solar module.

The control unit 101 controls the operation of the circulating pump 46 in such a way that the circulating pump 46 is first switched on when a heat demand for heating the service water is given, such that heating medium is fed from the heat accumulator 4 to the heat exchanger 6. If no service water circulation module 74 is provided, this heat demand for the service water is detected via the combined temperature/flow rate sensor 98. If this sensor detects a flow in the flow path through the connection part 60, i.e. a flow of service water, this means that a tap point for hot service water is open, such that cold service water flows in through the connection opening 38 and a heat demand for heating the service water is given. The control unit 101 can thus start up the circulating pump 46 in this case.

If the service water circulation module 74 is provided, the service water demand cannot be detected since the sensor 98, also owing to the circulation effected by the second circulating pump 76, detects a flow when no tap point for service water is open. In this case merely the temperature of the service water emergent from the heat exchanger 6 can be detected by the sensor 98 and, if this is below a predetermined threshold value, the circulating pump 46 can be switched on in order to compensate for the heat losses caused by circulation, in such a way that heating medium is fed to the heat exchanger 6 and the circulated service water is thus heated.

In this case the temperature sensor 96 is used in order to detect a service water demand owing to the opening of a tap point 7. As illustrated schematically in FIG. 11, this temperature sensor is not arranged precisely at the junction of the flow duct 32 in the base element 28 into which the portions of the flow duct from the connection openings 36 and 38 and 40 merge, but instead is offset from this junction towards the connection opening 38. This means, the temperature sensor 96 is located in the portion of the flow duct through which the cold service water is fed. If a tap point for heated service water is opened, this leads to a flow of cold service water in this line portion, such that a decrease in temperature is detected, as can be seen in the lower curve in FIG. 12, by the sensor 96 in the portion of the first flow duct 32, which runs to the connection opening 38. When such a decrease in temperature is detected, the control unit 101 switches on the circulating pump 46 for the supply of heating medium. A plurality of successive service water requests are illustrated in FIG. 12, which each lead again to a decrease in temperature and, once the request for heated service water is over, lead again to a rise in temperature since the water in the line portion in which the temperature sensor 96 is arranged is heated again.

In the second connector 30 the temperature sensor 96 is arranged slightly above the junction where the flow paths or portions of the flow duct 32 from the connection openings 36, 38 and 40 meet. It is thus ensured that the water in the line portion in which the sensor 96 is located is slowly heated again, when the tap point for service water is closed and there is thus no flow, by heat transfer by the service water circulated by the circulating pump 46 so as to flow from the connection opening 40 to the inlet 16.

As already described above, the heat exchanger 6 forms the bearing element of the service water heating unit 2, on which the connectors 26, 30, 48 and optionally 50 are fastened to the pumps 46 and optionally 76 and to the sensor box 100. The service water heating unit 2 thus forms an integrated module which can be incorporated as a prefabricated unit into a heating installation or into a heating system. The circulating pumps 46 and 76 are arranged relative to the heat exchanger 6 in such a way that their axes of rotation X extend parallel to the surfaces of the plates, in particular the outer plates 13. A holding device in the form of a clip 106 is mounted on the heat exchanger 6 in order to in turn fasten the heat exchanger 6 with the components mounted thereon to the heat accumulator 4 or to another element of a heating installation. The clip 106 forms a fastening device for fastening to the heat accumulator 4 and further forms handle elements 108 at which the entire service water heating unit 2 can be gripped, it thus being possible to handle the entire unit in a simple manner during assembly.

FIG. 14 shows a specific arrangement of service water heating units 2. In this arrangement four service water heating units 2 according to the description above are connected in parallel in a cascade-like manner in order to satisfy a greater service water demand. In the example illustrated, four service water heating units 2 are shown. However, it is to be understood that fewer or more service water heating units 2 can also be arranged accordingly depending on the maximum service water demand. In the example shown all service water heating units 2 are supplied with heating medium from a common heat accumulator 4. The service water heating units 2 are identical, except for one. The first service water heating unit 2, the one which is arranged beside the heat accumulator 4 in FIG. 14, is formed according to the design which is shown in FIGS. 1, 2, 4, 7, 8 and 11, i.e. this first service water heating unit 2 comprises a service water circulation module 74. The service water circulation module 74, which comprises the second circulating pump 46, is connected to the circulation line 90. This connects, at the tap point 7 located farthest away, to the line for heated service water DHW. Heated service water can thus be circulated through the entire line system, which supplies the tap points 7 with heated service water. The functioning of this service water heating unit 2 comprising a service water circulation module 74 basically corresponds to the description above. The three other service water heating units 2 are formed without a service water circulation module 74, i.e. as shown in FIG. 5.

Each of the service water heating units 2 according to FIG. 14 comprises a control unit 101 integrated into the circulating pump 46 and a separate sensor box 100. The individual control units 101 of the plurality of service water heating modules 2 communicate with one another via air interfaces 110 (see FIG. 13). In the first service water heating unit 2 the air interface 110 can also be used for communication with the second circulating pump 76 and optionally with the switching valve 66. However, it is also possible for the switching valve 66 to be controlled via the sensor box 100 and, for this purpose, is connected to the sensor box 100 via an electric connection line.

The control units 101 of all service water heating units 2 are formed identically and together control the cascade arrangement, as will now be described in greater detail with reference to FIG. 15.

In FIG. 15 the four service water heating units 2 are denoted as M1, M2, M3 and M4. In the small boxes arranged beneath, the numbers 1 to 4 denote the starting sequence of the service water heating units 2. The service water heating unit 2 which has position 1 in the starting sequence (in the first step M2) adopts a management function, i.e. is the managing service water heating unit 2, i.e. of which the control unit 101 also allows the further service water heating units 2 to be switched on and off.

If there is a service water request, i.e. one of the tap points 7 is opened, this is detected in the managing service water heating unit 2, as described above, by the combined temperature/flow rate sensor 98. The service water heating units 2 denoted by M2 to M4 are the service water heating units 2 shown in FIG. 14 without a service water circulation module 74. The service water heating unit 2 comprising the service water circulation module 74 is the module denoted in FIG. 15 by M1. This never adopts a managing function. If the managing module M2 now detects a service water request in step A, this service water heating unit 2 is started up first, i.e. the circulating pump 46 feeds heating medium to the associated heat exchanger 6. If the service water request is now switched off from steps B to C, this managing service water heating unit 2 is still heated in step C. If there is now a new service water request from steps C to D as a result of the opening of a tap point 7, this managing service water heating unit 2 (M2) is thus started up again. If the service water demand now increases, for example by the opening of a further tap point 7, a next service water heating unit 2 is switched on in step E in that the control unit 101 of the managing service water heating unit 2 (M2) of the service water heating unit 2 in the second position in the starting sequence (in this case M3) sends a signal for start-up. Its control unit 101 then accordingly starts up the circulating pump 46 of this further service water heating unit 2 (M3) in order to supply the heat exchanger 6 thereof with heating medium.

If the service water request is again stopped from step E to step F, the service water heating unit 2 is switched off and the control units 101 of the individual service water heating units 2 again determine the starting sequence among themselves. This occurs in that the service water heating unit 2 which was switched on last now adopts the first position in the starting sequence, and the service water heating unit 2 which was switched on first, i.e. the previously managing service water heating unit 2, returns to the last position (in this case M2). The managing function also changes accordingly to the service water heating unit 2 which is now in the first position in the starting sequence (M2). A uniform utilisation of the service water heating units 2 is thus ensured and the service water heating unit 2 which is started up first is simultaneously preferably a service water heating unit 2 which still contains residual heat. The service water heating unit 2 comprising the service water circulation module 74 always maintains the last position in the starting sequence, i.e. it is only switched on with maximum load and, for the rest, merely heats circulated service water. Should a service water heating unit 2 be faulty or fail, it is removed completely from the starting sequence, i.e. it is no longer started up at all. All this occurs by communication of the identical control units 101 with one another, and therefore a central control can be omitted.

A valve 112, which is not described above with reference to FIGS. 1 to 13, is additionally arranged in the inlet line for cold service water DCW of each service water heating unit 2 in order to switch off the service water heating units 2 when they are not heating service water. This valve 112 is controlled by the control unit via the sensor box 100. The valve 112 is preferably connected via an electrical connection line to the sensor box 100 and the control unit 101 sends a signal to the sensor box 100, via the input interface 104 and the output interface 102, to open and close the valve 112. If the valve 112 is closed, no service water flows through the respective heat exchanger 6, such that cold service water is prevented from flowing through the heat exchanger 6 of the unused service water heating units 2 into the outlet line for heated service water DHW.

The temperature control of the heated service water DHW in a service water heating unit 2 according to the above description will now be described with reference to FIG. 16. A regulator 114 is arranged in the control unit 101 and a setpoint temperature $T_{ref}$ for the heated service water DHW is predetermined for this regulator. For example, this setpoint temperature can be adjusted at the control unit 101 in the circulating pump 46. For this purpose control elements may be provided on the circulating pump 46. Alternatively, an adjustment may also be made via a wireless interface, for example infrared or radio, by means of remote operation or via system automation. The actual temperature $T_{DHW}$ of the heated service water DHW detected by the sensor 98 is subtracted from the setpoint value $T_{ref}$. The difference is fed to the regulator 114 as an error $\Delta T$. This outputs a setpoint speed $\omega_{ref}$ for the circulating pump 76, at which the circulating pump 46 is controlled, such that it feeds a volume flow $Q_{CH}$ of heating medium to the heat exchanger 6. The incoming cold service water DCW is then heated in this heat exchanger 6, such that it has the output temperature $T_{DHW}$ on the outlet side of the heat exchanger 6. This actual value $T_{DHW}$ is then, as described, detected by the sensor 98 and again fed to the regulator. This means, in accordance with the invention the speed of the circulating pump 46 and therefore the volume flow $Q_{CH}$ of the heating medium is controlled as a function of the output temperature of the hot service water DHW.

In this example, a disturbance variable feedforward is further provided in the regulator 114 in order to achieve a rapid response characteristic. For this purpose, the volume flow rate of the service water is also detected by the sensor 98 and this service water volume flow rate $Q_{DHW}$ is sent to the regulator 114 as a disturbance variable. Furthermore, the temperature $T_{CHin}$ of the heating medium fed to the heat exchanger 6 by the circulating pump 46 is detected by the temperature sensor 94 and is sent to the regulator 114 as a disturbance variable. Taking into account this disturbance variable, the setpoint speed $\omega_{ref}$ of the circulating pump 46 is accordingly adjusted, such that even the speed of the circulating pump 46 can be increased, for example with cooler heating medium and/or greater service water volume flow rate, in order to reach more quickly the required setpoint temperature $T_{ref}$ for the service water to be heated. A further disturbance variable or a further parameter which affects the service water temperature $T_{DHW}$ is the temperature $T_{DCW}$ of the incoming cold service water DCW. In the example shown, however, this is not sent to the regulator 114 as a disturbance variable, since the cold water temperature is generally basically constant. However, if the cold water temperature is subjected to considerable fluctuations, it would be conceivable to also send the temperature $T_{DCW}$ to the regulator 114 as a disturbance variable.

LIST OF REFERENCE NUMERALS

2—service water heating unit
4—heat accumulator
6—heat exchanger
7—tap point
8—housing
10—first flow path for the heating medium
12—second flow path for the service water
13—outer plates
14—inlet
16—outlet
18—inlet
20—outlet
22—temperature curve of the heating medium
24—temperature curve of the service water
26—first connector
28—base element
30—second connector
32, 34—flow ducts
36, 38, 40—connection openings or line connections
42—seals
44—feed line
46—first circulating pump
48—third connector
50—fourth connector
52—flow duct
54, 56, 58—connection openings or line connections
60—connection part
62—line connection
64—line
66—switching valve
68, 70—connection points
72—cold water line
74—service water circulation module
76—second circulating pump
78—connection part
80—pipe
81—seat
82—connection element
84—connecting piece
86, 88—connection openings
90—circulation line
92—sensor holder
94, 96—temperature sensors
97—junction
98—sensor
99—lines
100—sensor box
101—control unit or control and regulation electronics
102—output interface
104—input interface
106—clip
108—handle
110—radio interface
112—valve
DCW—cold service water
DHW—hot service water
CHO—hot heating medium, heating medium feed
CHR—cold heating medium, heating medium return
$T_{ref}$—setpoint temperature
$T_{DHW}$—temperature of the heated service water
$T_{DCW}$—temperature of the cold service water
$T_{CHin}$—temperature of the heating medium
$Q_{DHW}$—service water volume flow rate
$Q_{CH}$—heating medium volume flow rate
$\Delta T$—error
$\omega_{ref}$—setpoint speed

The invention claimed is:

1. A pump system comprising at least one pump unit (46, 76) which circulates fluid, at least one control unit (101) for controlling the at least one pump unit (46, 76), the at least one control unit being integrated into one of the at least one pump units (46, 76) and at least one sensor (94, 96, 98) spatially separate from each of the at least one pump units (46, 76), wherein the at least one sensor (94, 96, 98) is connected only to a data detection module (100) that is spatially separate from each of the at least one pump units (46, 76), which detects output signals of the at least one sensor (94, 96, 98), the data detection module (100) comprising an output interface (102) to transfer the detected sensor signals or data derived therefrom to the at least one control unit, and each of the at least one control units (101) is provided with an input interface (104) for the acquisition of signals or data from the output interface (102).

2. The pump system according to claim 1, wherein the at least one sensor (94, 96, 98) is connected to the data detection module (100) via a cable (99).

3. The pump system according to claim 1, wherein the output interface (102) and the input interface (104) are formed as wireless interfaces.

4. The pump system according to claim 1, further comprising a plurality of sensors (94, 96, 98) which are connected to the data detection module (100) and the data detection module (100) provides the sensor signals of all of the sensors (**94,

96, 98) and/or data derived therefrom at the output interface (102) for transfer to the input interface (104) of the at least one control unit (101).

5. The pump system according to claim 1, wherein the input interface of the at least one control unit and the output interface of the data detection module are designed in such a way that the at least one control unit (101) accesses, via the input interface (104) from the output interface (102), data or signals required by the at least one control unit (101).

6. The pump system according to claim 1, wherein the at least one pump unit (46) is configured or adapted to circulate water.

7. The pump system according to claim 1, wherein the at least one control unit (101) is designed to control a plurality of pump units (46, 76) or valves (66, 112).

8. The pump system according to claim 7, wherein the at least one control unit (101) comprises a communication interface (110) for communication with further pump units (76) for control thereof.

9. The pump system according to claim 1, wherein each of the at least one sensor (94, 96, 98) is a temperature, absolute or differential pressure or volume flow rate sensor.

10. The pump system according to claim 1, wherein the pump system is part of a service water heating device.

\* \* \* \* \*